(12) United States Patent
Kawanami et al.

(10) Patent No.: US 11,969,806 B2
(45) Date of Patent: Apr. 30, 2024

(54) CUTTING TOOL AND METHOD FOR MANUFACTURING MACHINED PRODUCT

(71) Applicant: KYOCERA Corporation, Kyoto (JP)

(72) Inventors: Shoji Kawanami, Moriyama (JP); Kaoru Hatta, Kusatsu (JP)

(73) Assignee: KYOCERA Corporation, Kyoto (JP)

( * ) Notice: Subject to any disclaimer, the term of this patent is extended or adjusted under 35 U.S.C. 154(b) by 330 days.

(21) Appl. No.: 16/969,230

(22) PCT Filed: Feb. 15, 2019

(86) PCT No.: PCT/JP2019/005645
§ 371 (c)(1),
(2) Date: Aug. 12, 2020

(87) PCT Pub. No.: WO2019/163677
PCT Pub. Date: Aug. 29, 2019

(65) Prior Publication Data
US 2021/0001415 A1    Jan. 7, 2021

(30) Foreign Application Priority Data
Feb. 26, 2018   (JP) ................................. 2018-032321

(51) Int. Cl.
*B23C 5/10* (2006.01)
*B23C 5/20* (2006.01)

(52) U.S. Cl.
CPC .............. *B23C 5/109* (2013.01); *B23C 5/202* (2013.01); *B23C 2200/20* (2013.01);
(Continued)

(58) Field of Classification Search
CPC .......... B23C 2210/486; B23C 2200/00; B23C 2200/04; B23C 2250/16; B23C 5/00;
(Continued)

(56) References Cited

U.S. PATENT DOCUMENTS

| 4,564,321 A | 1/1986 | Kondo et al. |
| 4,812,087 A | 3/1989 | Stashko |

(Continued)

FOREIGN PATENT DOCUMENTS

| DE | 7935032 U1 | 3/1980 |
| DE | 3417168 A1 | 11/1984 |

(Continued)

OTHER PUBLICATIONS

JP 3754920 Machine Translation (Year: 2006).*
Frey, DE 102004011297 A1 Machine Translation (Year: 2005).*

*Primary Examiner* — Nicole N Ramos
(74) *Attorney, Agent, or Firm* — Volpe Koenig (57) ABSTRACT

A cutting tool may have a columnar shape extended along a rotation axis from a first end toward a second end, and may include a holder, a first insert and a second insert. The holder may include a first pocket, a second pocket, a first flute and a second flute. The second pocket may be located closer to the second end than the first pocket. The first flute may be extended along the first pocket. The second flute may be extended along the second pocket. A first length from the rotation axis to the first flute may be smaller than a second length from the rotation axis to the second flute. An opening width of the first flute may be smaller than an opening width of the second flute.

12 Claims, 12 Drawing Sheets

(52) U.S. Cl.
CPC .... *B23C 2210/241* (2013.01); *B23C 2210/40* (2013.01); *B23C 2210/405* (2013.01)

(58) Field of Classification Search
CPC ..... B23C 5/003; B23C 5/006; B23C 2210/28; B23C 2210/287; B23C 2210/40; B23C 2210/402; B23C 2210/405; B23C 2210/407; B23C 2210/168; B23C 2210/241; B23C 2230/00; B23C 2230/04; B23C 2210/50; B23C 2200/36; B23C 2210/325; B23C 5/10; B23C 5/109; B23C 5/02; B23C 5/04; B23C 5/06; B23C 5/12; B23C 5/20; B23C 5/2247; B23C 5/202; B23C 5/205; B23C 5/165; B23C 5/18
See application file for complete search history.

(56) References Cited

U.S. PATENT DOCUMENTS

| | | | |
|---|---|---|---|
| 6,976,811 | B1 | 12/2005 | Deroche et al. |
| 8,807,881 | B2 * | 8/2014 | Itoh .......................... B23C 3/30 |
| | | | 407/42 |
| 8,974,154 | B2 | 3/2015 | Hoefler et al. |
| 2018/0250757 | A1 | 9/2018 | Kuroda |

FOREIGN PATENT DOCUMENTS

| | | | | |
|---|---|---|---|---|
| DE | 102004011297 | A1 * | 9/2005 | ............ B23C 5/109 |
| DE | 102004011297 | A1 | 9/2005 | |
| JP | 2004-510594 | A | 4/2004 | |
| JP | 3754920 | B2 * | 3/2006 | ............ B23C 5/109 |
| JP | 3754920 | B2 | 3/2006 | |
| JP | 2008-110453 | A | 5/2008 | |
| JP | 2011-020235 | A | 2/2011 | |
| JP | 2014-083629 | A | 5/2014 | |
| JP | 2014-210324 | A | 11/2014 | |
| WO | 2017/038763 | A1 | 3/2017 | |

* cited by examiner

CUTTING TOOL AND METHOD FOR MANUFACTURING MACHINED PRODUCT

CROSS-REFERENCE TO RELATED APPLICATIONS

This application is a national stage entry according to 35 U.S.C. 371 of PCT Application No. PCT/JP2019/005645, filed on Feb. 15, 2019, which claims priority to Japanese Application No. 2018-032321, filed on Feb. 26, 2018, which is entirely incorporated herein by reference.

TECHNICAL FIELD

The present disclosure embodiments relates to a cutting tool for use in a cutting process and a method for manufacturing a machined product.

BACKGROUND

For example, a cutting tool is discussed in Japanese Unexamined Patent Publication No. 2004-510594 (Patent Document 1) as a cutting tool for use in a cutting process of a workpiece. The cutting tool discussed in Patent Document 1 may include a holder, a flute, a pocket, a cutting insert and a shank part. The flute may be extended from a side of a front end of the holder toward a rear end thereof. The pocket may be located on a side of the front end of the holder and located along the flute. The cutting insert may be attached to the pocket. The shank part may be located on a side of the rear end of the holder.

In general, chatter vibration may be more likely to occur at a portion having a larger distance from the shank part. A plurality of cutting inserts may be attached to the single flute of the holder in a rotation axis direction of the holder in the cutting tool discussed in Patent Document 1. Of the plurality of cutting inserts, the cutting insert attached to a side closer to the front end may be more susceptible to chatter vibration.

SUMMARY

A cutting tool in a non-limiting embodiment may include a holder, a first insert and a second insert. The holder may have a columnar shape extended along a rotation axis from a first end toward a second end, and may include a first pocket, a second pocket, a first flute and a second flute. The first pocket may be located on a side of the first end of the holder. The second pocket may be located closer to the second end than the first pocket. The first flute may be extended along the first pocket from the first end toward the second end. The second flute may be extended along the second pocket from the first end toward the second end. The first insert may be located in the first pocket. The second insert may be located in the second pocket. A length from the rotation axis to the first flute may be a first length in a first cross section that is orthogonal to the rotation axis and includes the first flute. A length from the rotation axis to the second flute may be a second length in a second cross section that is orthogonal to the rotation and includes the second flute. The first length may be smaller than the second length. An opening width of the first flute in the first cross section may be smaller than an opening width of the second flute in the second cross section.

DETAILED DESCRIPTION

Cutting tools in non-limiting embodiments may be described in detail below with reference to the drawings. For the sake of description, each of the drawings referred to in the following may illustrate, in a simplified form, only main members necessary for describing the non-limiting embodiments. The cutting tools in the present disclosure may therefore be capable of including any arbitrary structural member not illustrated in the drawings referred to. Dimensions of the members in each of the drawings may be ones which faithfully represent neither dimensions of actual structural members nor dimension ratios of these members.

Figure 1:
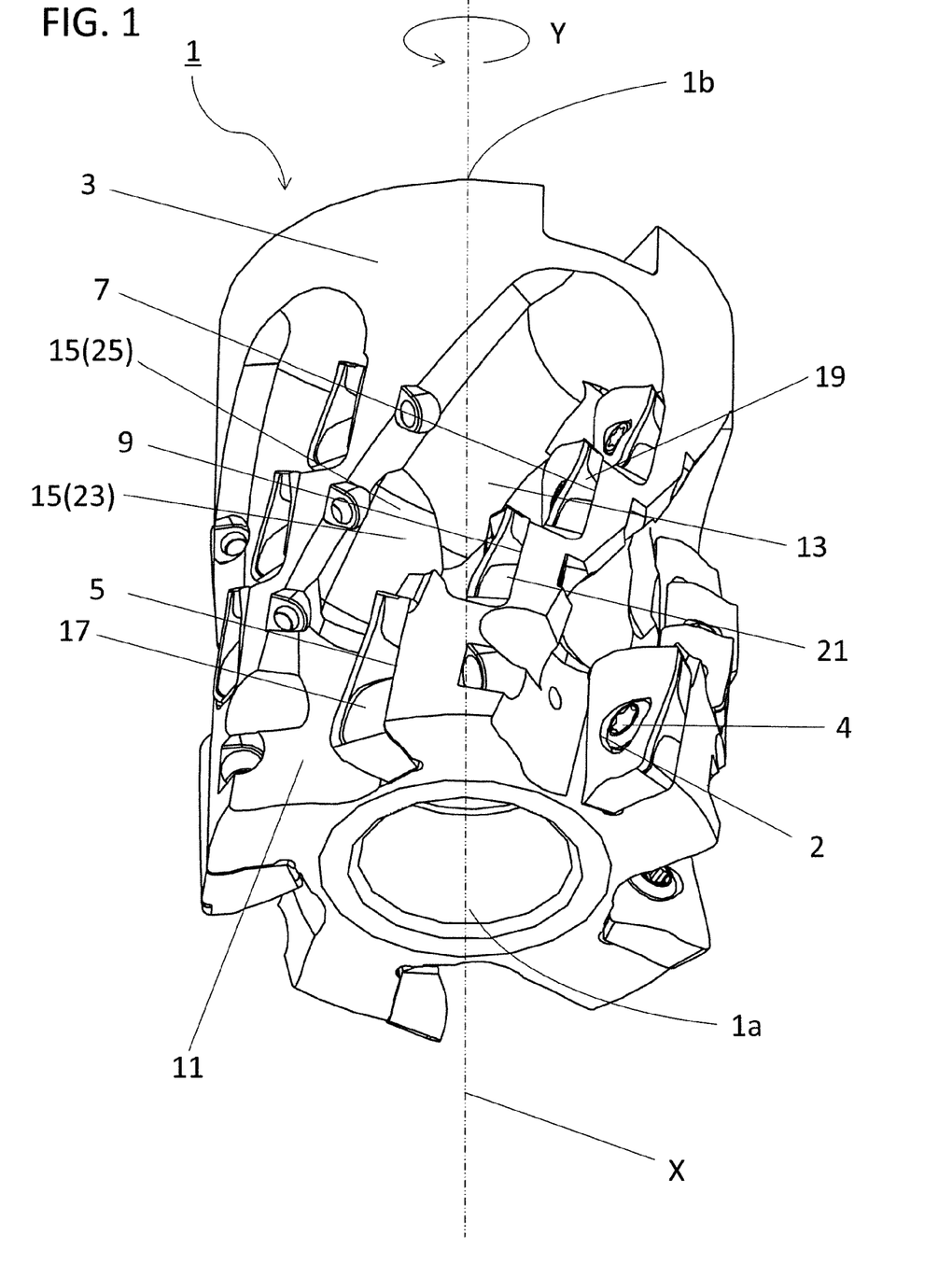
FIG. 1 is a perspective view illustrating a cutting tool in a non-limiting embodiment.
Figure 2:
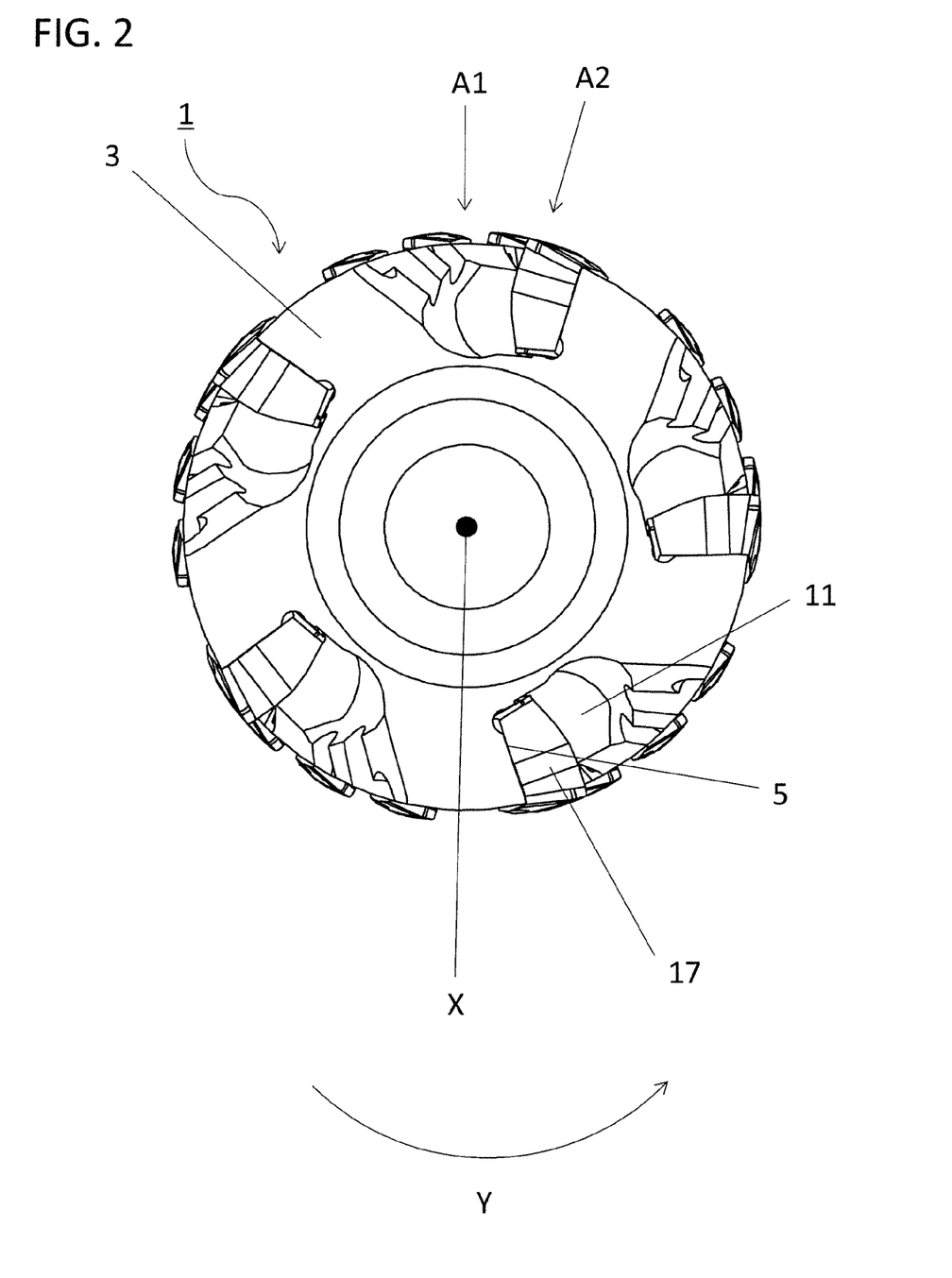
FIG. 2 is a front view of the cutting tool illustrated in FIG. 1 as viewed toward a first end.

The cutting tool 1 in the non-limiting embodiments may include a holder 3 that includes a rotation axis X and a plurality of pockets disposed on an outer peripheral surface thereof, and inserts individually attached to the plurality of pockets as illustrated in FIG. 1 or the like. The rotation axis X may be an axis of rotation and may not be a concrete object included in the cutting tool 1. The plurality of pockets may be disposed at equal intervals or unequal intervals along the rotation axis X.

In the non-limiting embodiments illustrated in FIGS. 1, 3 and 4, the cutting tool 1 of the non-limiting embodiment may have a columnar shape extended along the rotation axis X from a first end 1a (hereinafter also referred to as the front end 1a) toward a second end 1b (hereinafter also referred to as the rear end 1b). The cutting tool 1 may not have a strict columnar shape because of the plurality of pockets and the like included therein.

The cutting tool 1 may include the holder 3 in the non-limiting embodiment. The cutting tool 1 may be designed to be coupled through a side of the rear end 1b to a machine tool. In the non-limiting embodiment illustrated in FIGS. 1, 3 and 4, the holder 3 may include a first pocket 5 located on a side of the front end 1a, and a second pocket 7 located closer to the rear end 1b than the first pocket 5. The holder 3 may also include a first flute 11 extended along the first pocket 5 from the front end 1a toward the rear end 1b, and a second flute 13 extended along the second pocket 7 from the front end 1a toward the rear end 1b.

The first flute 11 and the second flute 13 may be located in a single flute extended from a side of the front end 1a toward the rear end 1b. The single flute may include the first flute 11 on the side of the front end 1a, and the second flute 13 located closer to the rear end 1b than the first flute 11.

Figure 4:
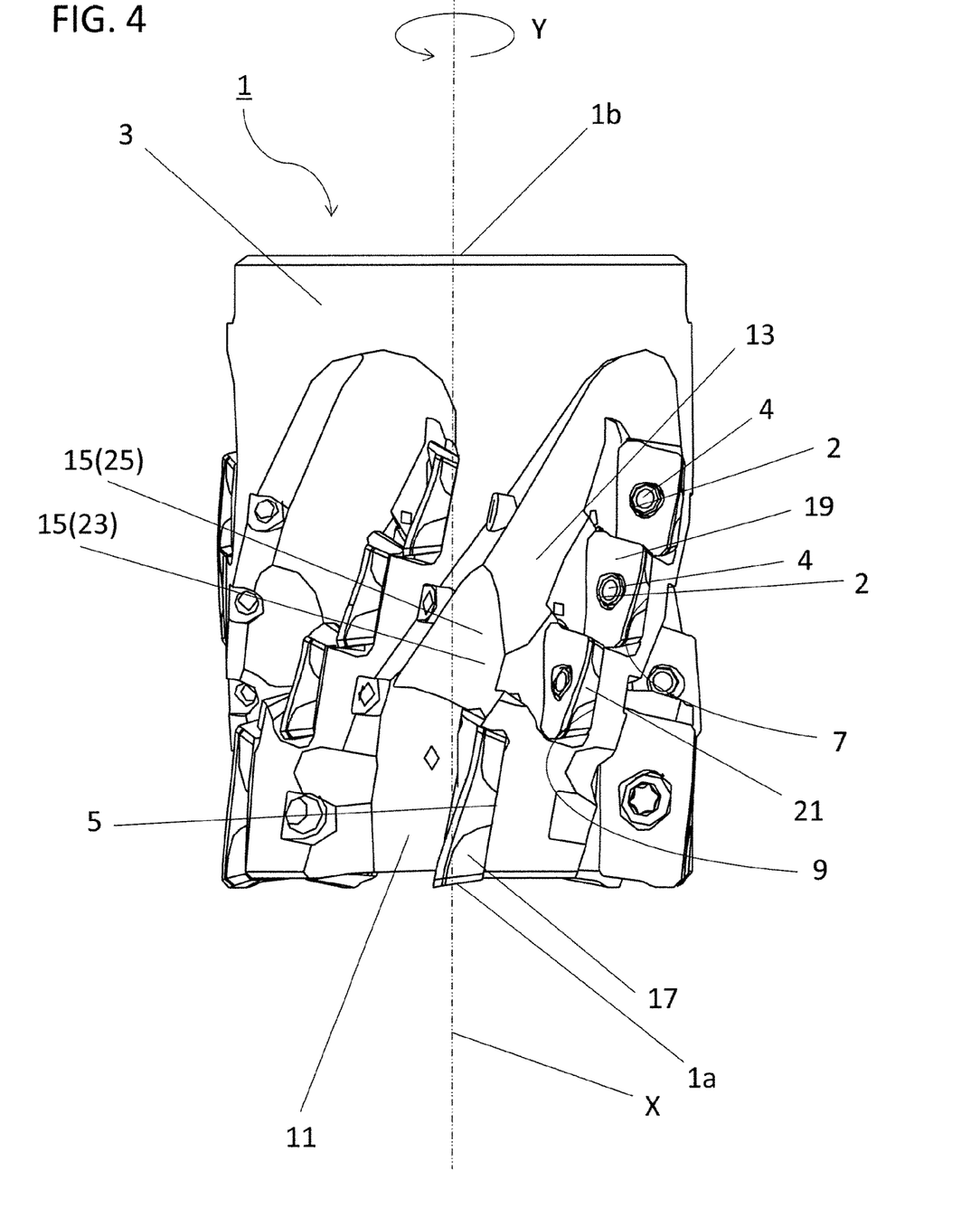
FIG. 4 is a side view of the cutting tool illustrated in FIG. 2 as viewed from an A2 direction.

The cutting tool 1 may include a first insert 17 located in the first pocket 5 and a second insert 19 located in the second pocket 7 in the non-limiting embodiment illustrated in FIGS. 1, and 4. The first pocket 5 and the second pocket 7 may be respectively parts that permit attachment of the first insert 17 and the second insert 19, and may open toward an outer peripheral surface of the holder 3.

Figure 3:
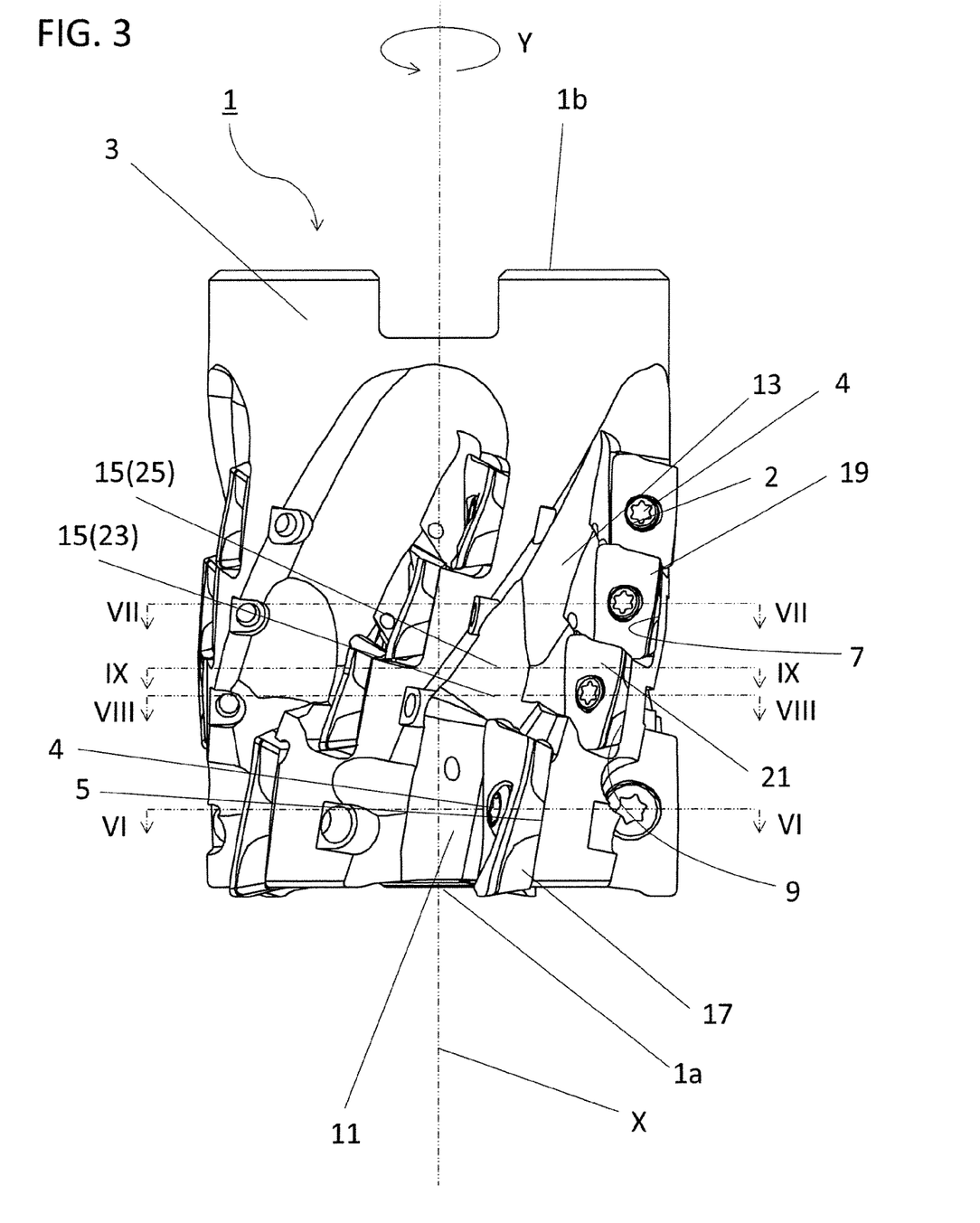
FIG. 3 is a side view of the cutting tool illustrated in FIG. 2 as viewed from an A1 direction.
Figure 5:
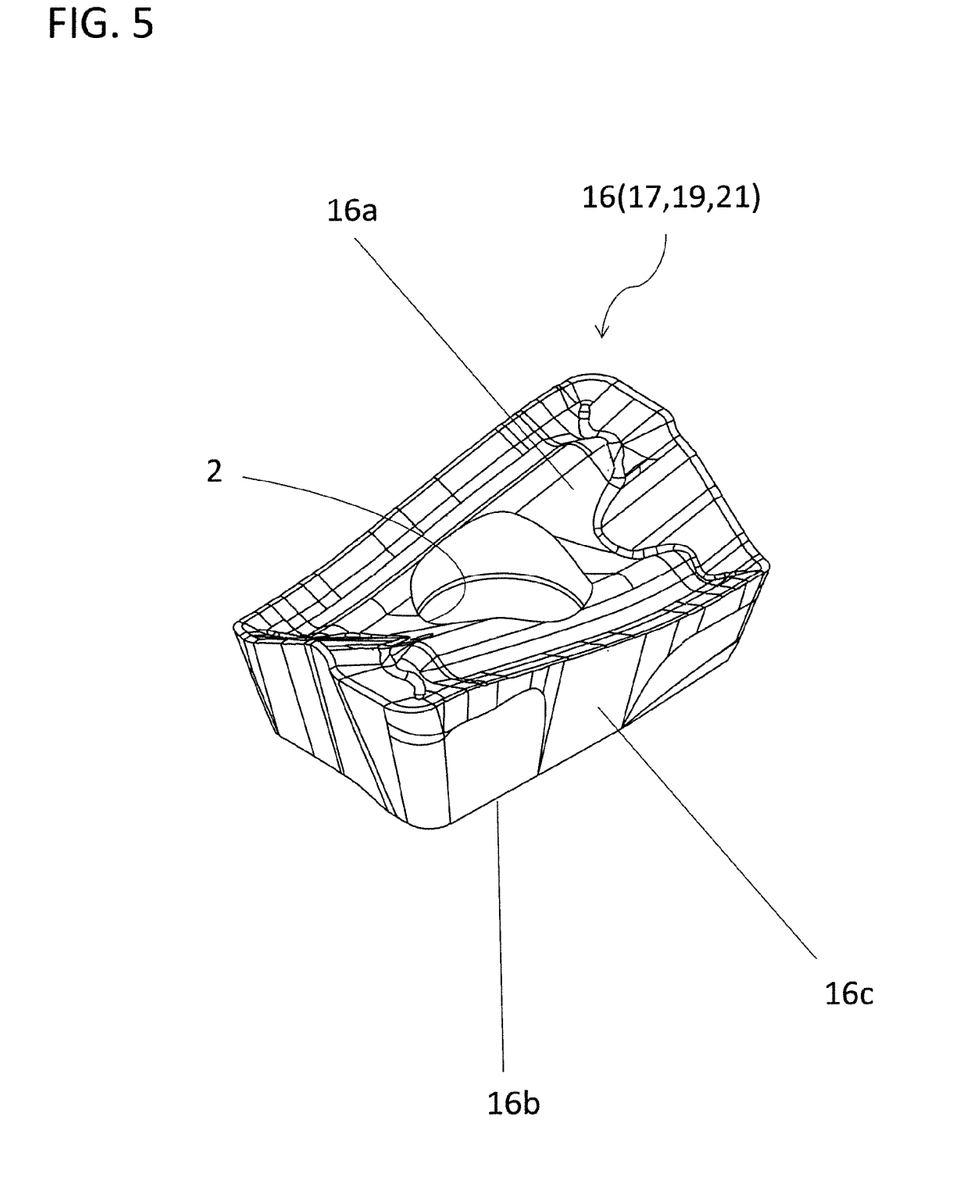
FIG. 5 is a perspective view of an insert in the cutting tool illustrated in FIG. 1.

FIG. 5 may illustrate an insert 16 represented by the first insert 17 and the second insert 19 in the non-limiting embodiment illustrated in FIGS. 1, 3 and 4. The insert 16 may include an upper surface 16a and a lower surface 16b each having a polygonal shape. The upper surface 16a may have an approximately quadrangular shape in a non-limiting embodiment illustrated in FIG. 5. Alternatively, the insert 16 may include a side surface 16c located between the upper surface 16a and the lower surface 16b.

The upper surface 16a may have an approximately polygonal shape but need not have a strict polygonal shape. In other words, sides of the polygonal shaped upper surface 16a need not have a strict straight line shape but may have, for example, a convex curvilinear shape or concave curvilinear shape. Corners of the polygonal shaped upper surface 16a are not limited to a structure formed by intersection of two straight lines, but may have, for example, an outwardly rounded shape.

The shape of the upper surface 16a is not limited to the above configurations. There may be no problem even if the upper surface 16a have a pentagonal, hexagonal or octagonal shape instead of the quadrangular shape.

The insert 16 represented by the first insert 17 and the second insert 19 in the non-limiting embodiment may include a cutting edge on at least a part of a ridgeline formed by the upper surface 16a and the side surface 16c. For example, the first insert 17 attached to the first pocket 5 may include an outer peripheral cutting edge and a bottom cutting edge as a cutting edge in the non-limiting embodiment illustrated in FIG. 1. The second insert 19 attached to the second pocket 7 may include an outer peripheral cutting edge as a cutting edge.

The insert 16 represented by the first insert 17 and the second insert 19 may include a hole 2 that opens into the upper surface 16a. The hole 2 may be used as an insertion hole for a fixing tool when attaching the first insert 17 and the second insert 19 to the holder 3. Examples of the fixing tool may include a screw and a clamp.

The first insert 17 and the second insert 19 may be respectively attached to the first pocket 5 and the second pocket 7 by a screw 4 in the cutting tool 1 of the non-limiting embodiment illustrated in FIGS. 1, 3 and 4. The hole 2 may pass through the lower surface 16b located on a side opposite to the upper surface 16a in the cutting tool 1.

If the hole 2 passes therethrough, the screw 4 may be inserted into each of the holes 2 of the first insert 17 and the second insert 19. Subsequently, front ends of the screws 4 may be inserted into and attached to screw holes individually formed in the first pocket 5 and the second pocket 7, so that the first insert 17 and the second insert 19 may be attached to the holder 3.

The hole 2 is not limited to the above embodiment. For example, the hole 2 may open into a side surface or pass through two regions located on sides of the side surface opposed to each other.

Dimensions of the first insert 17 and the second insert 19 are not particularly limited. For example, a maximum width of the upper surface may be set to approximately 3-20 mm. A height from the upper surface to the lower surface may be set to approximately 5-20 mm.

Figure 6:
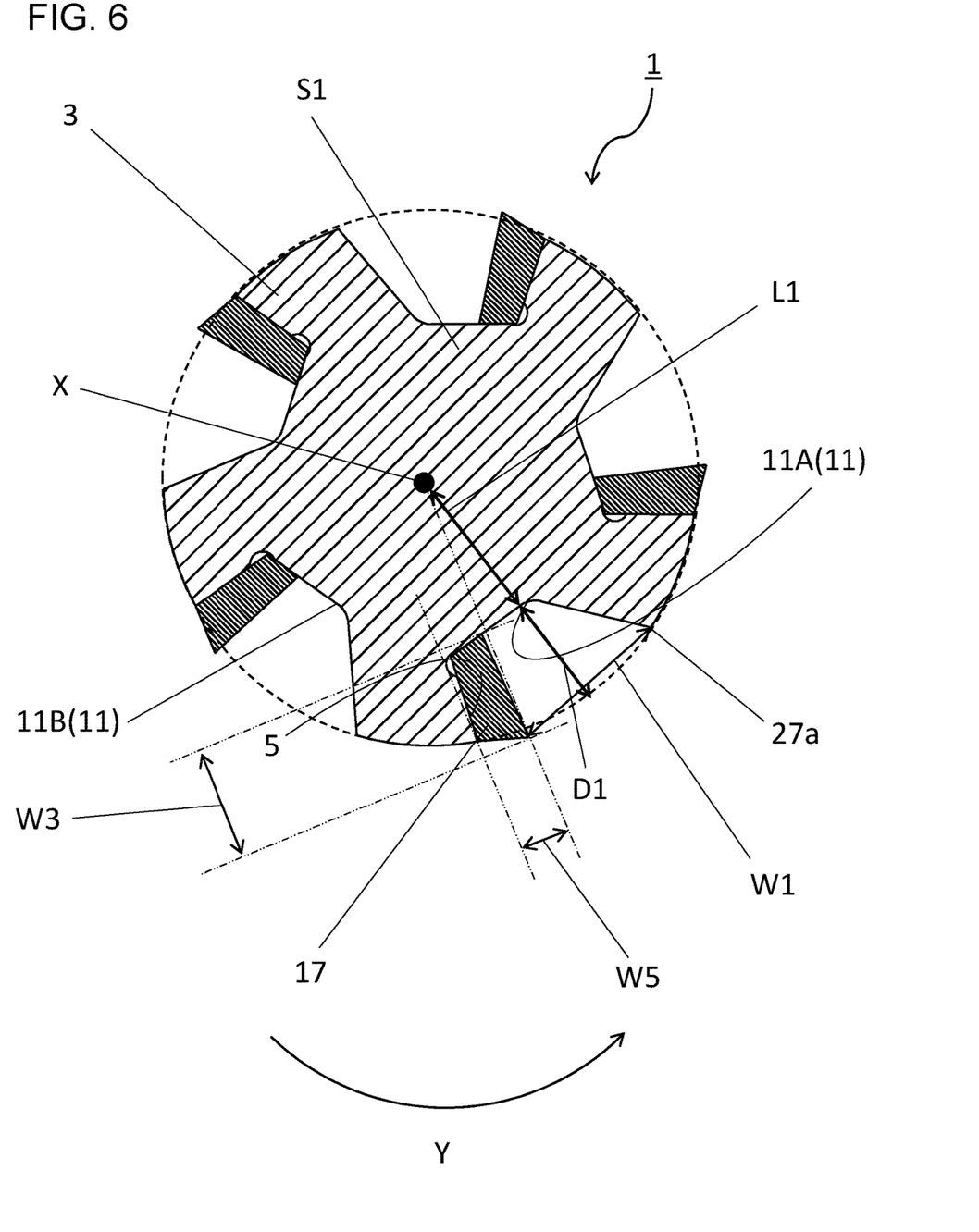
FIG. 6 is a cross-sectional view taken along the line VI-VI of FIG. 3.
Figure 7:
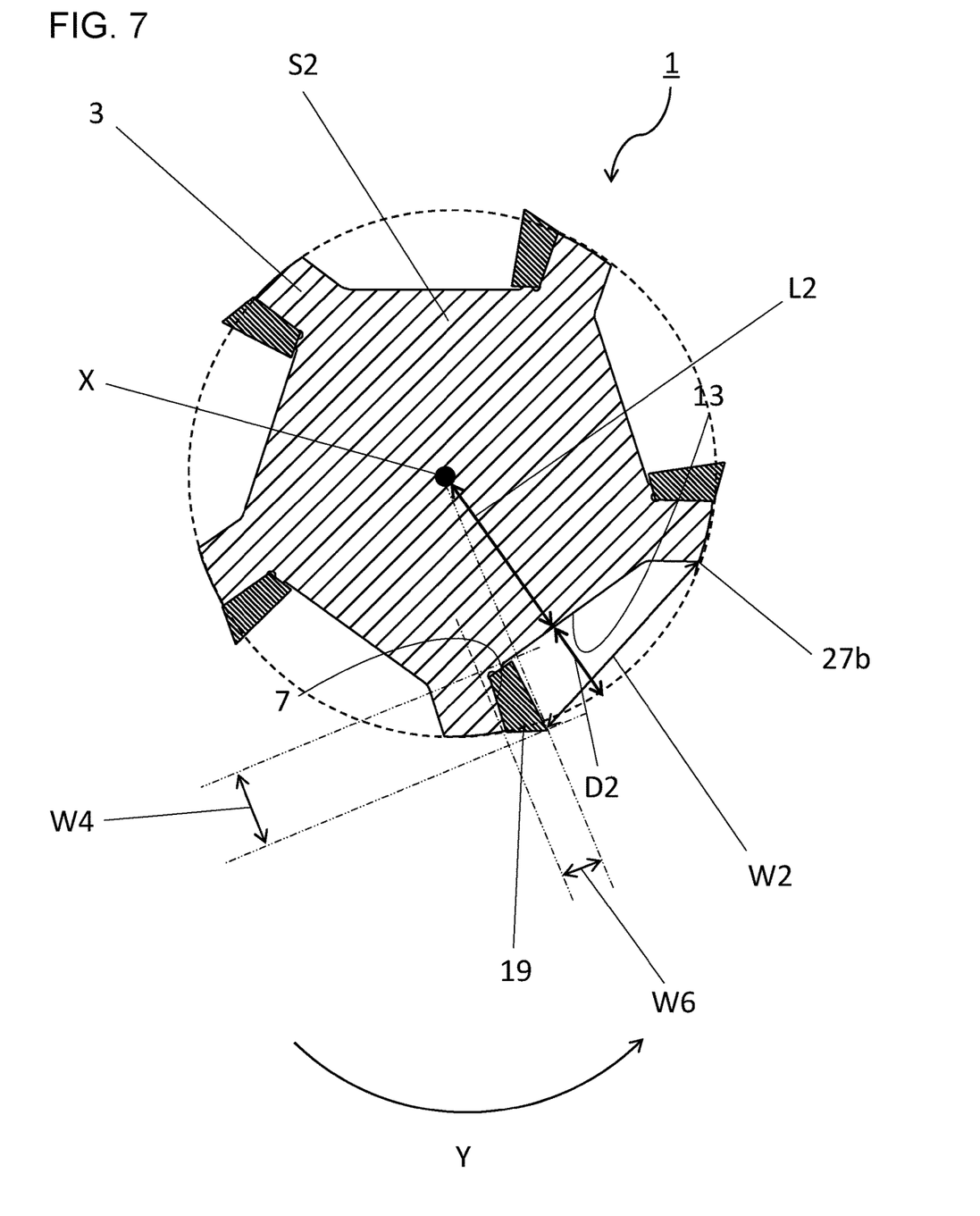
FIG. 7 is a cross-sectional view taken along the line VII-VII of FIG. 3.

FIG. 6 may illustrate a cross-section taken along the line VI-VI illustrated in FIG. 3 (a first cross section VI) that is orthogonal to the rotation axis X and includes the first flute 11. A length from the rotation axis X to the first flute 11 in the first cross section VI may be a first length L1. FIG. 7 may illustrate a cross-section taken along the line VII-VII illustrated in FIG. 3 (a second cross section VII) that is orthogonal to the rotation axis X and includes the second flute 13. A length from the rotation axis X to the second flute 13 in the second cross section VII may be a second length L2. The holes 2 and the screws 4 may be omitted in FIGS. 6 and 7 in order to facilitate visual understanding.

The first length L1 may be smaller than the second length L2 in the cutting tool 1 as illustrated in the non-limiting embodiment of FIGS. 6 and 7. In other words, a flute depth D1 of the first flute 11 may be larger than a flute depth D2 of the second flute 13. The cutting tool 1 may have good chip discharge performance because the first length L1 is smaller than the second length L2.

The first insert 17 may include the bottom cutting edge and the peripheral cutting edge as a cutting edge. The cutting inserts other than the first insert 17 may not include the bottom cutting edge but may include only the peripheral cutting edge. Hence, an amount of cutting of a workpiece at the first insert 17 may tend to become larger than that at the cutting insert other than the first insert 17.

The flute depth D1 of the first flute 11 may be larger than the flute depth D2 of the second flute 13 in the cutting tool 1 of the non-limiting embodiment as described above. This may make it possible to suitably discharge chips along the first flute 11 even if a large amount of chips occurs at the first insert 17.

The first cross section VI illustrated in FIG. 6 may be a cross section that is orthogonal to the rotation axis X and passes through a midpoint of the first insert. The first length L1 that is a length from the rotation axis X to the first flute 11 may be evaluated in the cross section.

The midpoint of the first insert 17 may be determined in the following procedure. The procedure may include determining an end portion on a side of the front end 1a and an end portion on a side of the rear end 1b in the first insert 17, and determining a position of the midpoint in the direction along the rotation axis X from positions of these two end portions. The position of the midpoint may correspond to the midpoint of the first insert 17.

If a center of the hole 2 of the first insert 17 coincides with the midpoint of the first insert 17, a cross section that passes through the center of the hole 2 of the first insert 17 and is orthogonal to the rotation axis X may be used instead of the first cross section VI.

An evaluation may be made of the first length L1 that is a length from the rotation axis X to the first flute 11 in a cross section of a region located between the cross section, which passes through the midpoint and is orthogonal to the rotation axis X, and the first cross section VI.

The second cross section VII illustrated in FIG. 7 may be a cross section that is orthogonal to the rotation axis X and passes through the midpoint of the second insert 19. An evaluation may be made of the second length L2 that is a length from the rotation axis X to the second flute 13 in this cross section.

The midpoint of the second insert 19 may be determined in the following procedure. The procedure may include determining an end portion on a side of the front end 1*a* and an end portion on a side of the rear end 1*b* in the second insert 19, and determining a position of a midpoint in the direction along the rotation axis X from positions of these two end portions. The position of the midpoint may correspond to the midpoint of the second insert 19.

If a center of the hole 2 of the second insert 19 coincides with the midpoint of the second insert 19, a cross section that passes through the center of the hole 2 of the second insert 19 and is orthogonal to the rotation axis X may be used instead of the second cross section VII.

An evaluation may be made of the second length L2 that is a length from the rotation axis X to the second flute 13 in a cross section of a region located between the cross section, which passes through the midpoint and is orthogonal to the rotation axis X, and the second cross section VII.

As in the non-limiting embodiment illustrated in FIGS. 6 and 7, an opening width W1 of the first flute 11 in the first cross section VI may be smaller than an opening width W2 of the second flute 13 in the second cross section in the cutting tool 1.

In the non-limiting embodiment illustrated in FIG. 6, the opening width W1 may be a length from an end portion most away from the rotation axis X in the first insert 17 to a heel 27*a* located forward in a rotation direction with respect to the end portion. In the non-limiting embodiment illustrated in FIG. 7, the opening width W2 may be a length from an end portion most away from the rotation axis X in the second insert 19 to a heel 27*b* located forward in the rotation direction with respect to the end portion.

As used here, the heel 27*a* may correspond to a part which is a boundary between the outer peripheral surface of the holder 3 and the first flute 11 and which is extended from a side of the front end 1*a* toward the rear end 1*b*. The heel 27*b* may correspond to a part which is a boundary between the outer peripheral surface of the holder 3 and the second flute 13 and which is extended from a side of the front end 1*a* toward the rear end 1*b*.

The cutting tool 1 may be less prone to chatter vibration if the opening width W1 is smaller than the opening width W2 as in the non-limiting embodiment illustrated in FIGS. 6 and 7. The reasons for this are as follows.

In general, the cutting tool may become more prone to chatter vibration at a position located more away from a connection portion with a machine tool. That is, the cutting tool 1 may be more prone to chatter vibration on a side of the front end 1*a* than on a side of the rear end 1*b*. The opening width W1 in the first flute 11 located on the side of the front end 1*a* away from the connection portion with the machine tool may be smaller than the opening width W2 in the second flute 13 located on the side of the rear end 1*b* that is the connection portion with the machine tool in the cutting tool 1 of the non-limiting embodiment. It may be therefore easy to ensure a thickness of a part of the holder 3 which is located backward in the rotation direction with respect to the first pocket 5. For example, the thickness of the holder 3 may be large in between the first flute 11A and the first flute 11B located backward in the rotation direction with respect to the first flute 11A. Consequently, the cutting tool 1 may be less prone to chatter vibration in the non-limiting embodiment.

The first length L1 may be smaller than the second length L2, and the opening width W1 of the first flute 11 in the first cross section VI may be smaller than the opening width W2 of the second flute 13 in the second cross section VII in the cutting tool 1 of the present disclosure. Hence, with the cutting tool 1 in the non-limiting embodiments, the good chip discharge performance may be compatible with reduction of chatter vibration.

A width W3 of the first insert 17 in a radial direction of the holder 3 may be larger than a width W4 of the second insert 19 in the radial direction of the holder 3. If the width W3 of the first insert 17 in the radial direction of the holder 3 is relatively large as described above, the first insert 17 may have enhanced stiffness, and consequently chatter vibration may become much less likely to occur.

The width W3 of the first insert 17 in the radial direction may be a length in a direction orthogonal to the rotation axis X if the upper surface of the first insert 17 is viewed from the front. The width W4 of the second insert 19 in the radial direction may be a length in a direction orthogonal to the rotation axis X if the upper surface of the second insert 19 is viewed from the front.

A thickness W5 of the first insert 17 in a circumferential direction of the holder 3 may be larger than a thickness W6 of the second insert 19 in the circumferential direction of the holder 3. If the thickness W5 of the first insert 17 is large, the first insert 17 may have enhanced stiffness, and therefore chatter vibration may become much less likely to occur.

The thickness W5 of the first insert 17 in the circumferential direction may be a maximum value of a length in a direction orthogonal to the rotation axis X in a side view of the first insert 17. The thickness W6 of the second insert 19 in the circumferential direction may be a maximum value of a length in a direction orthogonal to the rotation axis X in a side view of the second insert 19.

The first length L1 may be changed or kept constant from a side of the front end 1 *a* toward the rear end 1 *b*. In other words, the flute depth D1 of the first flute 11 may be changed or kept constant from the side of the front end 1 *a* toward the rear end 1 *b*. If the first length L1 is kept constant from the side of the front end 1 *a* toward the rear end 1 *b*, a chip discharge space in the first flute 11 may tend to become constant from the side of the front end 1 *a* toward the rear end 1 *b*. When chips generated from the first insert 17 flow in the first flute 11, behaviors of the chips may tend to become stable, and chip clogging may be less likely to occur. This may lead to good chip discharge performance of the cutting tool 1.

The second length L2 may be changed or kept constant from a side of the front end 1 *a* toward the rear end 1 *b*. In other words, the flute depth D2 of the second flute 13 may be changed or kept constant from the side of the front end 1 *a* toward the rear end 1 *b*. If the second length L2 is kept constant from the side of the front end 1 *a* toward the rear end 1 *b*, a chip discharge space in the second flute 13 may tend to become constant from the side of the front end 1 *a* toward the rear end 1 *b*. When chips generated from the second insert 19 flow in the second flute 13, behaviors of the chips may tend to become stable, and chip clogging may be less likely to occur. This may lead to the good chip discharge performance of the cutting tool 1.

Alternatively, the holder 3 may include a third pocket 9 located closer to the rear end 1*b* than the first pocket 5 and located closer to the front end 1*a* than the second pocket 7 as in the non-limiting embodiment illustrated in FIGS. 1, 3 and 4. The holder 3 may further include a third flute 15 extended along the third pocket 9 from the front end 1*a* toward the rear end 1*b*. The cutting tool 1 may also include a third insert 21 located in the third pocket 9.

Like the first pocket 5 and the second pocket 7, the third pocket 9 may open toward the outer peripheral surface of the holder 3, and may include a screw hole that permit insertion of the screw 4. Like the first insert 17 and the second insert 19, the third insert 21 may include polygonal shaped upper surface and lower surface, and a side surface located between the upper and lower surfaces. The third insert 21 may include a cutting edge on a ridgeline formed by the upper surface and the side surface, and may also include a hole 2 that opens into the upper surface.

The third flute 15 may include a first region 23 located on a side of the front end 1a, and a second region 25 located on a side of the rear end 1b in the non-limiting embodiment illustrated in FIGS. 1, 3 and 4.

The first flute 11, the second flute 13 and the third flute 15 may be located in a single flute extended from a side of the front end 1a toward the rear end 1b. The single flute may include the first flute 11 on the side of the front end 1a, the second flute 13 located closer to the rear end 1b than the first flute 11, and the third flute 15 located between the first flute 11 and the second flute 13. The first region 23 may be located on a side of the first flute 11, and the second region 25 may be located on a side of the second flute 13 in the third flute 15.

Figure 8:
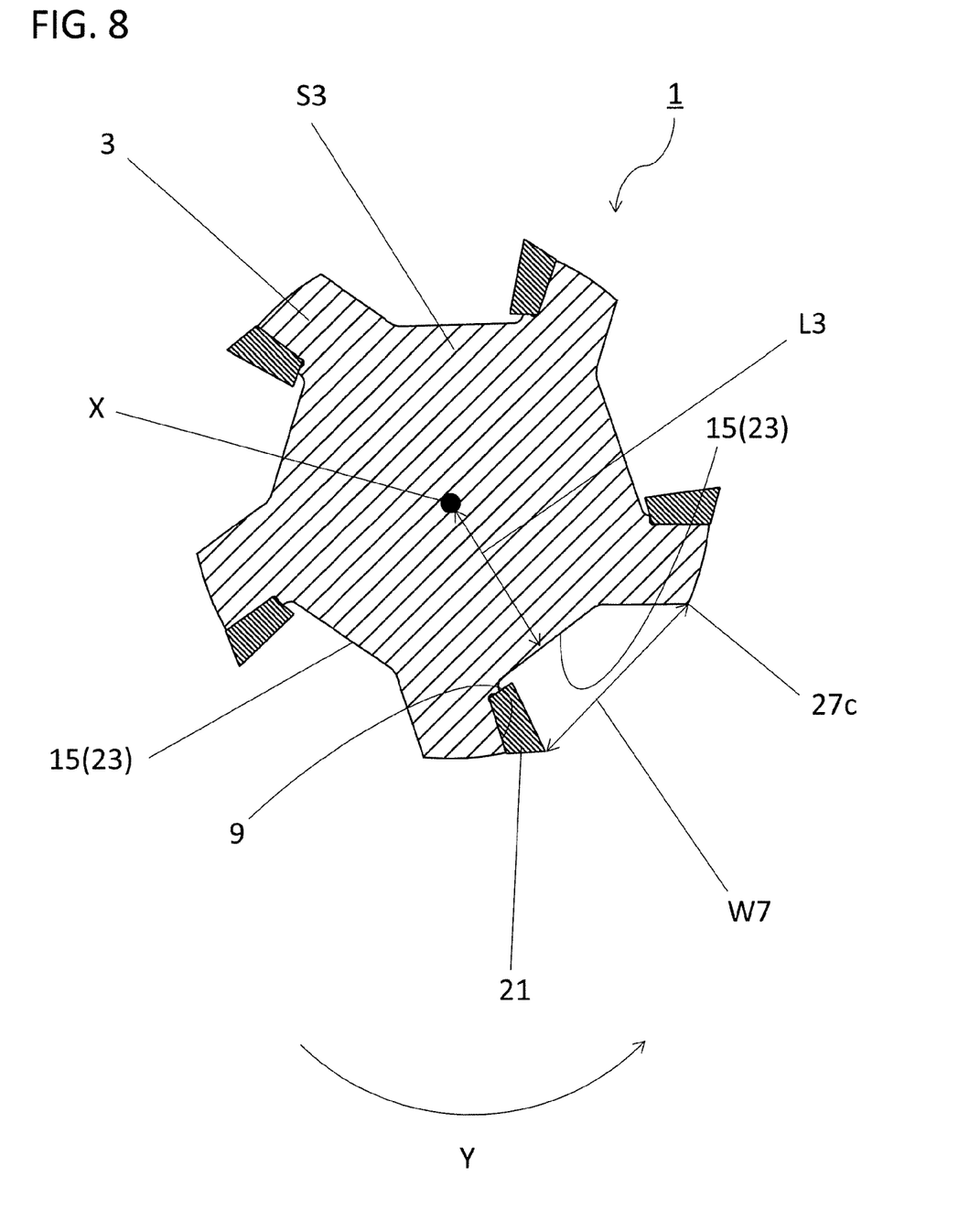
FIG. 8 is a cross-sectional view taken along the line VIII-VIII of FIG. 3.
Figure 9:
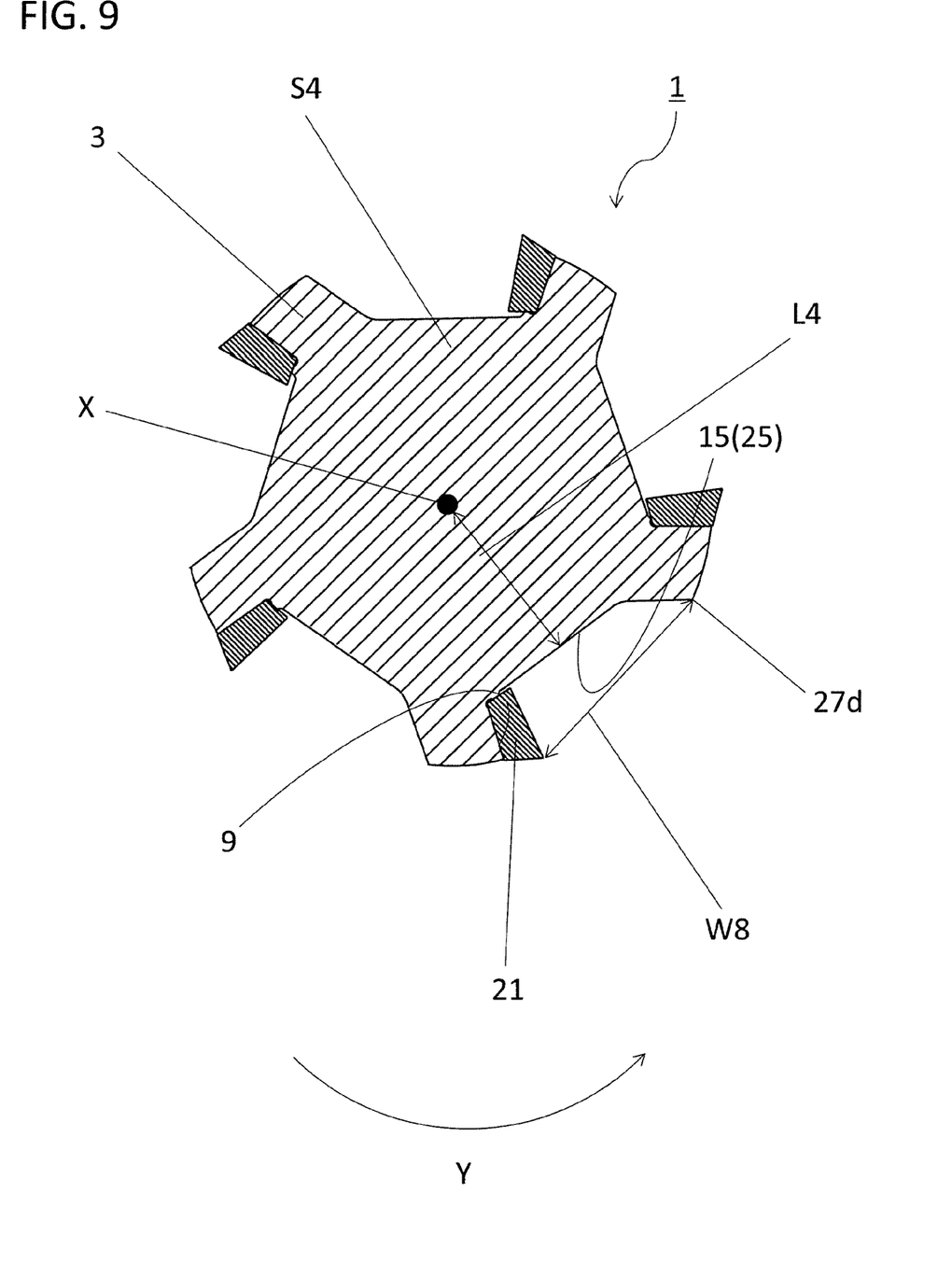
FIG. 9 is a cross-sectional view taken along the line IX-IX of FIG. 3.

FIG. 8 may illustrate the cross section taken along the line VIII-VIII illustrated in FIG. 3 (namely, a third cross section VIII), which is orthogonal to the rotation axis X and includes the first region 23. A third length L3 may be a length from the rotation axis X to the first region 23 in the third cross section VIII. FIG. 9 may illustrate the cross section taken along the line IX-IX illustrated in FIG. 3 (namely, a fourth cross section IX), which is orthogonal to the rotation axis X and includes the second region 25. A fourth length L4 may be a length from the rotation axis X to the second region 25 in the fourth cross section IX. The hole 2 and the screw 4 may be omitted in FIGS. 8 and 9 in order to facilitate visual understanding.

In the above case, the third length L3 may be smaller than the fourth length L4. In other words, a web thickness of the holder 3 in the first region 23 may be larger than a web thickness of the holder 3 in the second region 25 in the cutting tool 1 of the non-limiting embodiment illustrated in FIG. 3. Thus, if there is a difference of web thickness between a side of the front end 1a and a side of the rear end 1b of the third flute 15 located along the third insert 21, the first region 23 and the second region 25 may be different in vibration mode during a cutting process. Vibrations occurred in these regions may tend to be partially cancelled out, thereby reducing chatter vibration.

A length from the rotation axis X to the third flute 15 in a cross section that is orthogonal to the rotation axis X and includes the third flute 15 may become larger as going from a side of the front end 1a toward the rear end 1b in the non-limiting embodiment illustrated in FIG. 3. That is, a flute depth in the third flute 15 may become smaller as going from the side of the front end 1a toward the rear end 1b.

Because the flute depth in the third flute 15 is changed gradually if the third flute 15 has the above configuration, chip clogging may be less likely to occur in the third flute 15. The cutting tool 1 therefore may have good chip discharge performance.

If the length from the rotation axis X to the third flute 15 in the above cross section becomes larger as going from the side of the front end 1a toward the rear end 1b, an evaluation may be carried out, for example, in the following procedure. The procedure may include measuring a length from the rotation axis X to the third flute 15 in three or more cross sections that are orthogonal to the rotation axis X and include the third flute 15. These three cross sections may be different in position in a direction along the rotation axis X.

From a comparison among the lengths in these three or more cross sections, it is necessary that the length becomes larger for the cross section located closer to the rear end 1b. For example, the above length may be measured in each of a cross section that is orthogonal to the rotation axis X and passes through an end portion on a side of the front end 1a in the third flute 15, a cross section that is orthogonal to the rotation axis X and passes through an end portion on a side of the rear end 1b in the third flute 15, and a cross section that is orthogonal to the rotation axis X and passes through a midpoint in a direction along the rotation axis X in the third flute 15.

An opening width W7 of the first region 23 in the third cross section VIII may be smaller than an opening width W8 of the second region 25 in the fourth cross section IX.

The opening width W7 may denote a length from an end portion of the third insert 21 which is located most away from the rotation axis X to a heel 27c located forward in the rotation direction with respect to the end portion in a non-limiting embodiment illustrated in FIG. 8. The opening width W8 may denote a length from an end portion of the third insert 21 which is located most away from the rotation axis X to a heel 27d located forward in the rotation direction with respect to the end portion in a non-limiting embodiment illustrated in FIG. 9.

The heels 27c and 27d may be boundaries between the outer peripheral surface of the holder 3 and the third flute 15, and may correspond to parts extended from a side of the front end 1a toward the rear end 1b.

The cutting tool 1 may be less susceptible to chatter vibration if the opening width W7 is smaller than the opening width W8 as in the non-limiting embodiment illustrated in FIGS. 8 and 9.

For example, cemented carbide and cermet may be usable as a material of a member that forms the insert 5. Examples of composition of the cemented carbide may include WC—Co, WC—TiC—Co and WC—TiC—TaC—Co. The WC—Co may be produced by adding cobalt (Co) powder to tungsten carbide (WC), followed by sintering. The WC—TiC—Co may be produced by adding titanium carbide (TiC) to WC—Co. The WC—TiC—TaC—Co may be produced by adding tantalum carbide (TaC) to WC—TiC—Co.

The cermet may be a sintered composite material obtainable by compositing metal into a ceramic component. Examples of the cermet may include ones which are composed mainly of a titanium compound, such as titanium carbide (TiC) and titanium nitride (TiN).

A surface of the first insert 17, a surface of the second insert 19 and a surface of the third insert 21 may be coated with a coating film by using a chemical vapor deposition (CVD) method or a physical vapor deposition (PVD) method. Examples of composition of the coating film may include titanium carbide (TiC), titanium nitride (TiN), titanium carbonitride (TiCN) and alumina ($Al_2O_3$).

As a material of the holder 3, steel, cast iron and aluminum alloy may be usable. Steel may be preferable in view of high toughness.

<Method for Manufacturing Machined Product>

A method for manufacturing a machined product in a non-limiting embodiment of the present disclosure may be described below with reference to the drawings.

The machined product may be manufacturable by carrying out a cutting process of a workpiece. The method for manufacturing a machined product in the non-limiting embodiment may include the following steps:

(1) rotating the cutting tool 1 represented by the above non-limiting embodiment;
(2) bringing the cutting tool 1 being rotated into contact with a workpiece 101; and
(3) moving the cutting tool 1 away from the workpiece 101.

Figure 10:
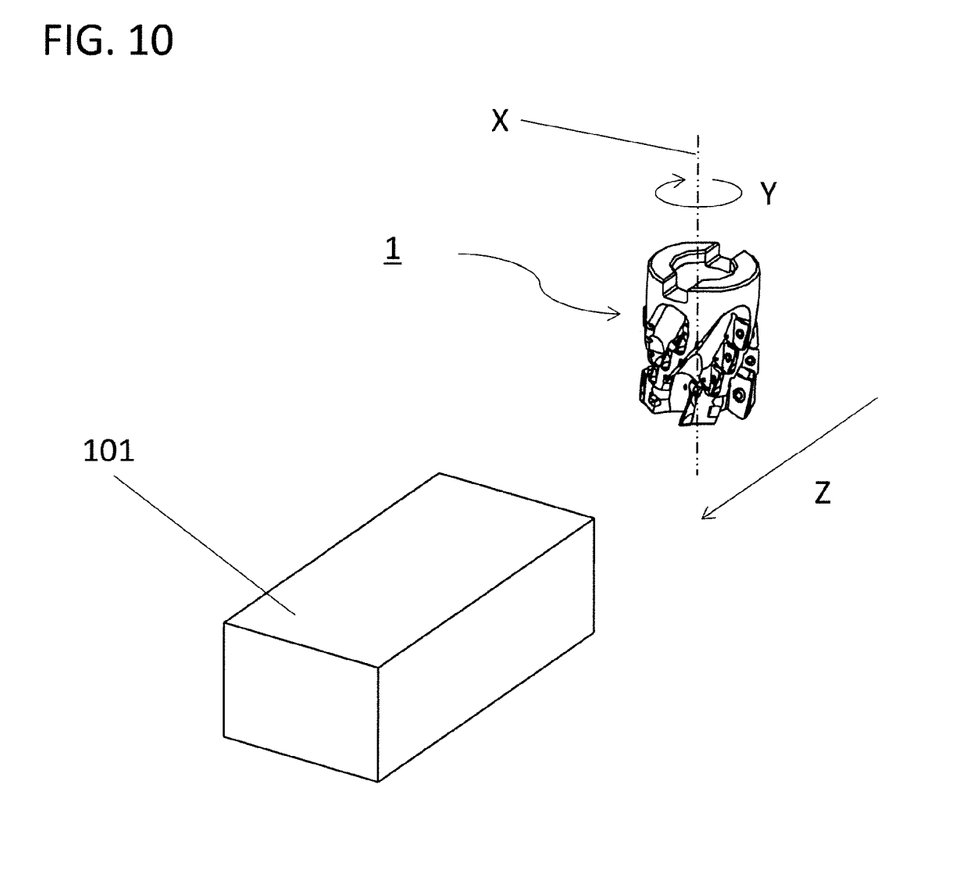
FIG. 10 is a diagram illustrating one of the steps in a method for manufacturing a machined product in a non-limiting embodiment.
Figure 11:
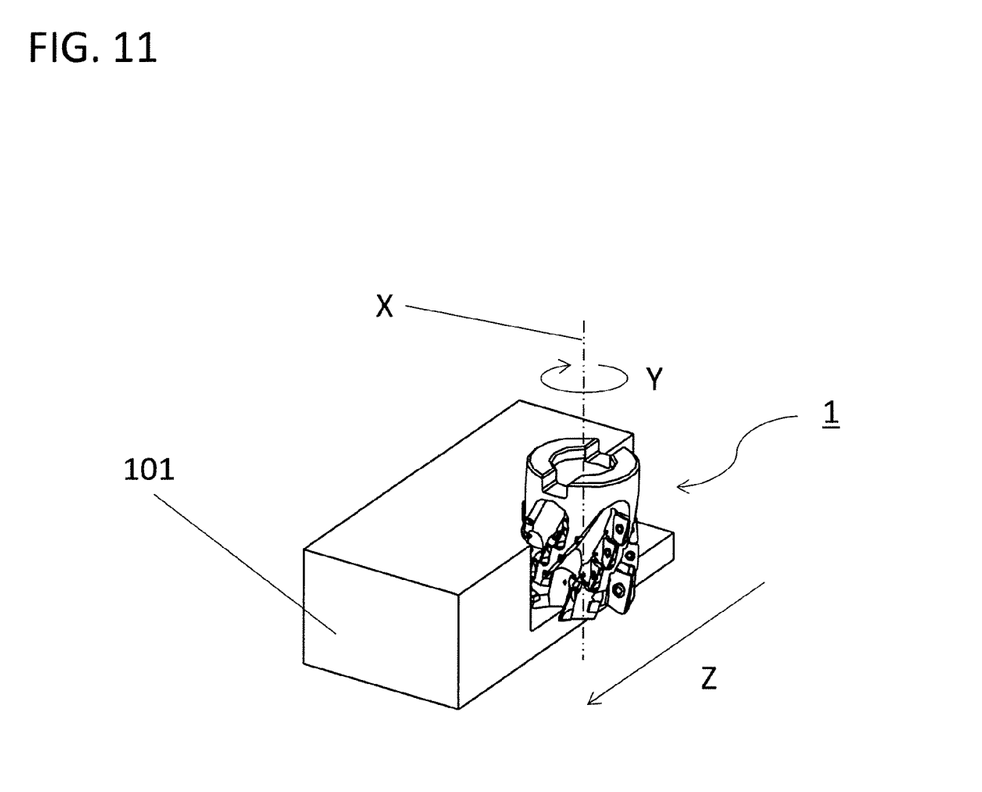
FIG. 11 is a diagram illustrating one of the steps in the method for manufacturing a machined product in the non-limiting embodiment.
Figure 12:
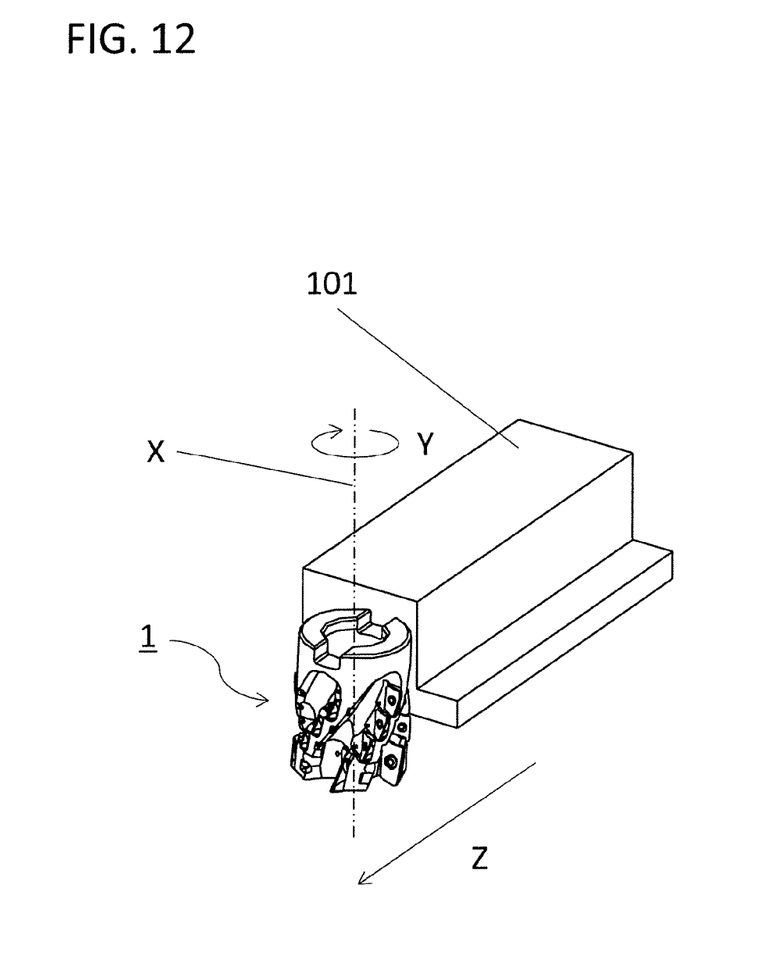
FIG. 12 is a diagram illustrating one of the steps in the method for manufacturing a machined product in the non-limiting embodiment.

More specifically, firstly, the cutting tool 1 may be rotated in a direction of a rotation direction Y around the rotation axis X, and the cutting tool 1 may be relatively brought near the workpiece 101 as illustrated in FIG. 10. Subsequently, the workpiece 101 may be cut out by bringing the cutting edge of the cutting tool 1 being rotated into contact with the workpiece 101 as illustrated in FIG. 11. The cutting tool 1 may be then relatively moved away from the workpiece 101 as illustrated in FIG. 12.

The cutting tool 1 may be brought near the workpiece 101 by moving the cutting tool 1 in a Z direction along the rotation axis X in a state where the workpiece 101 is fixed and the cutting tool 1 is rotated in a non-limiting embodiment illustrated in FIG. 10. In a non-limiting embodiment illustrated in FIG. 11, the workpiece 101 may be cut out by bringing the cutting tool 1 into contact with the workpiece 101 while moving the cutting tool 1 being rotated in the Z direction. In a non-limiting embodiment illustrated in FIG. 12, the cutting tool 1 may be moved away by moving it in the Z direction in a state where the cutting tool 1 is rotated.

In a cutting process with the manufacturing method in the non-limiting embodiment, the cutting tool 1 may be brought into contact with the workpiece 101, or the cutting tool 1 may be moved away from the workpiece 101 by moving the cutting tool 1 in each of the steps. However, there is no intention to limit to the above embodiment.

For example, the workpiece 101 may be brought near the cutting tool 1 in the step (1). Similarly, the workpiece 101 may be moved away from the cutting tool 1 in the step (3). If it is desired to continue the cutting process, the step of bringing the cutting edge of the cutting tool 1 into contact with different portions of the workpiece 101 may be repeated while the cutting tool 1 is kept rotating.

Examples of material of the workpiece 101 may include carbon steel, alloy steel, stainless steel, cast iron and non-ferrous metal.

Although the non-limiting embodiments in the present disclosure have been illustrated and described above, the present disclosure is not limited thereto. It is, of course, possible to make any optional ones insofar as they do not depart from the gist of the present disclosure.

Description of the Reference Numeral
1 cutting tool
1a first end (front end)
1b second end (rear end)
2 hole
3 holder
4 screw
5 first pocket
7 second pocket
9 third pocket
11 first flute
13 second flute
15 third flute
16 insert
16a upper surface
16b lower surface
16c side surface
17 first insert
19 second insert
21 third insert
23 first region
25 second region
27a, 27b, 27c, 27d heel
101 workpiece
W1 opening width of first flute
W2 opening width of second flute
W3 width of first insert
W4 width of second insert
W5 thickness of first insert
W6 thickness of second insert
W7 opening width of first region
W8 opening width of second region
L1 first length
L2 second length
L3 third length
L4 fourth length
VI first cross section
VII second cross section
VIII third cross section
IX fourth cross section
X rotation axis
Y rotation direction
Z cutting direction

The invention claimed is:

1. A cutting tool, having a columnar shape extended along a rotation axis from a first end toward a second end, the cutting tool comprising:
a holder comprising:
a first pocket located on a side of the first end,
a second pocket located closer to the second end than the first pocket,
a first flute extended along the first pocket from the first end toward the second end, and
a second flute extended along the second pocket toward the second end;
a first insert located in the first pocket; and
a second insert located in the second pocket, wherein:
a first distance from the rotation axis to the first flute in a first cross section that is orthogonal to the rotation axis and includes the first flute is a first length,
a second distance from the rotation axis to the second flute in a second cross section that is orthogonal to the rotation axis and includes the second flute is a second length, wherein the first length is smaller than the second length,
an opening width of the first flute in the first cross section is a first opening width,
an opening width of the second flute in the second cross section is a second opening width, wherein the first opening width is smaller than the second opening width, and
a flute depth of the first flute is larger than a flute depth of the second flute, wherein the flute depth of the first flute is defined as a radial distance of an outer circumference of the holder in the first cross section minus the first length, and the flute depth of the second flute is defined as a radial distance of the outer circumference of the holder in the second cross section minus the second length.

2. The cutting tool according to claim 1, wherein a width of the first insert in the radial direction of the holder is larger than a width of the second insert in the radial direction of the holder.

3. The cutting tool according to claim 1, wherein a thickness of the first insert in a circumferential direction of the holder is larger than a thickness of the second insert in the circumferential direction of the holder.

4. The cutting tool according to claim 1, wherein the first length is kept constant.

5. The cutting tool according to claim 1, wherein the second length is kept constant.

6. The cutting tool according to claim 1, wherein the holder further comprises
- a third pocket located closer to the second end than the first pocket and located closer to the first end than the second pocket, and
- a third flute extended along the third pocket toward the second end, wherein the third flute comprises:
- a first region located on a side closer to the first end, and
- a second region located on a side closer to the second end, wherein:
- a third distance from the rotation axis toward the first region in a third cross section that is orthogonal to the rotation axis and includes the first region is a third length, and
- a fourth distance from the rotation axis to the second region in a fourth cross section that is orthogonal to the rotation axis and includes the second region is a fourth length, and the third length is smaller than the fourth length.

7. A method for manufacturing a machined product, comprising:
- rotating the cutting tool according to claim 1 around the rotation axis;
- bringing the cutting tool being rotated into contact with a workpiece; and
- moving the cutting tool away from the workpiece.

8. A cutting tool, having a columnar shape extended along a rotation axis from a first end toward a second end, the cutting tool comprising:
- a holder comprising:
  - a first pocket located on a side of the first end,
  - a second pocket located closer to the second end than the first pocket,
  - a first flute extended along the first pocket from the first end toward the second end; and
  - a second flute extended along the second pocket toward the second end;
- a first insert located in the first pocket; and
- a second insert located in the second pocket,
wherein:
- a first distance from the rotation axis to the first flute in a first cross section that is orthogonal to the rotation axis and includes the first flute is a first length,
- a second distance from the rotation axis to the second flute in a second cross section that is orthogonal to the rotation axis and includes the second flute is a second length,
- an opening width of the first flute in the first cross section, that is orthogonal to the rotation axis and includes the first flute, is a first opening width,
- an opening width of the second flute in the second cross section, that is orthogonal to the rotation axis and includes the second flute, is a second opening width, wherein the first opening width is smaller than the second opening width, and
- a flute depth of the first flute is larger than a flute depth of the second flute, wherein the flute depth of the first flute is defined as a radial distance of an outer circumference of the holder in the first cross section minus the first length, and the flute depth of the second flute is defined as a radial distance of the outer circumference of the holder in the second cross section minus the second length.

9. The cutting tool according to claim 8, wherein a width of the first insert in the radial direction of the holder is larger than a width of the second insert in the radial direction of the holder.

10. The cutting tool according to claim 8, wherein a thickness of the first insert in a circumferential direction of the holder is larger than a thickness of the second insert in the circumferential direction of the holder.

11. The cutting tool according to claim 8, wherein the holder further comprises:
- a third pocket located closer to the second end than the first pocket and located closer to the first end than the second pocket, and
- a third flute extended along the third pocket toward a side closer to the second end, wherein the third flute comprises:
- a first region located closer to the first end, and
- a second region located closer to the second end, wherein:
- a first distance from the rotation axis toward the first region in a third cross section that is orthogonal to the rotation axis and includes the first region is a third length, and
- a second distance from the rotation axis to the second region in a fourth cross section that is orthogonal to the rotation axis and includes the second region is a fourth length, and the third length is smaller than the fourth length.

12. A method for manufacturing a machined product, comprising:
- rotating the cutting tool according to claim 8 around the rotation axis;
- bringing the cutting tool being rotated into contact with a workpiece; and
- moving the cutting tool away from the workpiece.

* * * * *